(12) United States Patent
DeFrance et al.

(10) Patent No.: US 12,720,261 B2
(45) Date of Patent: Aug. 25, 2026

(54) SYSTEMS AND METHODS FOR DETERMINING A SCORE FOR SPATIAL LOCALIZATION HEARING

(71) Applicant: CALYXEN, Montfaucon (FR)

(72) Inventors: Romaric DeFrance, Montfaucon (FR); Morgan Potier, Montredon-des-Corbières (FR); Frédéric Rembaud, Checy (FR)

(73) Assignee: XENYLAB, Payrac (FR)

( * ) Notice: Subject to any disclaimer, the term of this patent is extended or adjusted under 35 U.S.C. 154(b) by 96 days.

(21) Appl. No.: 17/744,049

(22) Filed: May 13, 2022

(65) Prior Publication Data

US 2022/0369035 A1 Nov. 17, 2022

(30) Foreign Application Priority Data

May 13, 2021 (FR) ....................................... 2105070

(51) Int. Cl.
*H04R 5/04* (2006.01)
*G02B 27/01* (2006.01)
*G06F 3/01* (2006.01)

(52) U.S. Cl.
CPC ........... *H04R 5/04* (2013.01); *G02B 27/0172* (2013.01); *G06F 3/011* (2013.01); *G06F 3/017* (2013.01)

(58) Field of Classification Search
CPC ....... H04R 5/04; G02B 27/0172; G06F 3/011; G06F 3/017
See application file for complete search history.

(56) References Cited

U.S. PATENT DOCUMENTS 6,181,800 B1 * 1/2001 Lambrecht .............. H04S 1/002 381/310
9,848,273 B1 * 12/2017 Helwani .............. H04R 25/552
11,112,389 B1 * 9/2021 Robinson ................. G01H 7/00
2011/0019846 A1 * 1/2011 Anderson ............ A61B 5/6814 381/313
2014/0257131 A1 9/2014 Polley et al.
2018/0082477 A1 * 3/2018 Wilde .................... G06Q 50/14
2018/0310115 A1 * 10/2018 Romigh .................. H04S 3/008
2020/0320768 A1 * 10/2020 Salemme ............. A61B 5/7475
2020/0387341 A1 * 12/2020 Robinson ............... H04R 25/50
2022/0183593 A1 * 6/2022 Horne ..................... H04S 7/304

FOREIGN PATENT DOCUMENTS

WO 2020212404 A1 10/2020

OTHER PUBLICATIONS

Wolf, et al.,; Implementing Continuous-Azimuth Binaural Sound in Unity 3D; 2020 IEEE Conference on Virtual Reality and 3D User Interfaces Abstracts and Workshops (VRW); DOI 10.1109/VRW50115.2020.0-193.

* cited by examiner

*Primary Examiner* — Daniel R Sellers
(74) *Attorney, Agent, or Firm* — Tucker Ellis LLP

(57) ABSTRACT

One of the objectives of this invention is to allow the conduction of audiometric evaluations in natural or artificial sound spaces, in a way that can be monitored and reproduced.

For that purpose, the inventors propose to create virtual environments which reproduce sound and visual characteristics of natural or artificial spaces.

In practice, a user experience is initiated between a subject and a virtual environment so as to simulate a specific audiometry test. Finally, a spatial auditory localization score is determined from measurements that will be carried out in the virtual environment.

18 Claims, 1 Drawing Sheet

[Fig. 1]
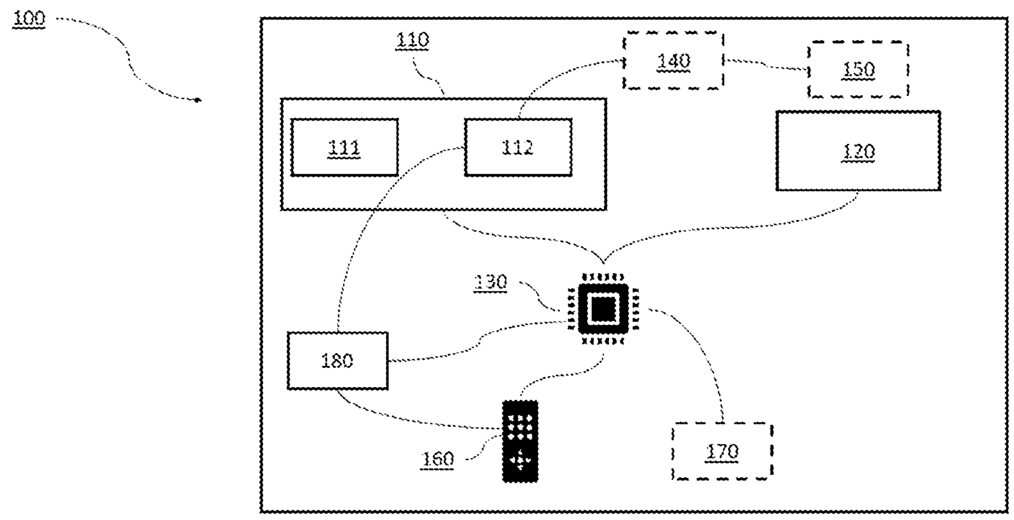
[Fig. 2]
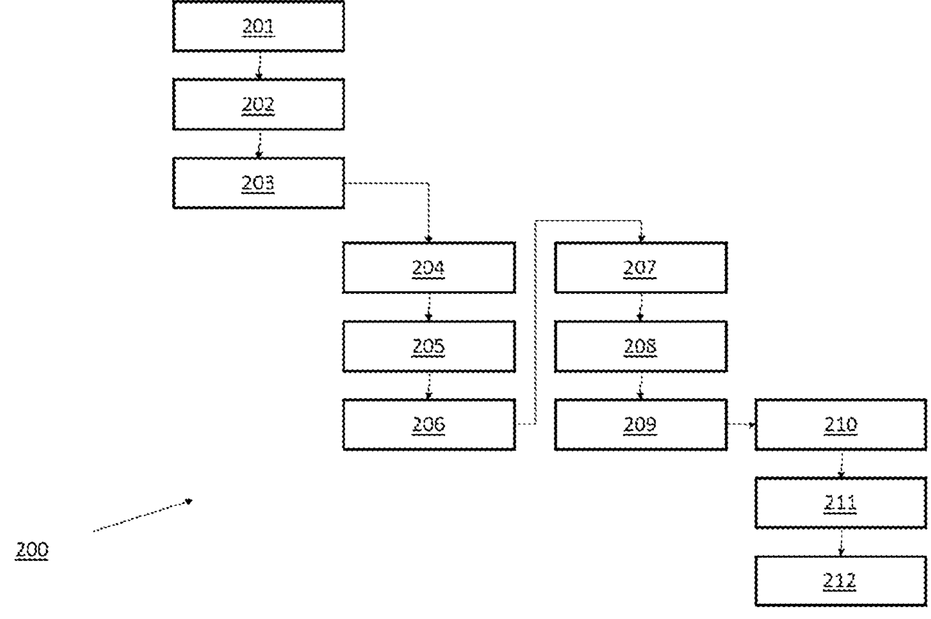

SYSTEMS AND METHODS FOR DETERMINING A SCORE FOR SPATIAL LOCALIZATION HEARING

TECHNICAL FIELD

The invention relates to the field of audiometry. Particularly, it relates to a system and method for determining a spatial auditory localization score.

PRIOR ART

Audiometric evaluation is one of the main elements of the diagnostic and therapeutic orientation regarding hearing disorders, such as hypoacusis, tinnitus and/or hyperacusis.

Indeed, the information provided by the audiometry traditionally carried out contributes to establishing an otologic diagnosis: probable site of the lesion, prognosis, therapeutic possibilities and functional results obtained.

It is known that the in-cabin clinical audiometric evaluation is usually carried out in a test environment that is not very representative of the patient's daily hearing experience.

However, it would be desirable to carry out audiometric evaluations in natural or artificial sound spaces.

Unfortunately, such spaces are hardly monitored and reproduced, in particular concerning the noise that may prevail there.

Thus, there is a need to carry out audiometric evaluations in natural or artificial sound spaces, in a way that can be monitored and reproduced.

SUMMARY OF THE INVENTION

The invention aims to solve, at least partially, this need.

The invention particularly relates to a system for determining a score representative of the spatial auditory localization ability of a patient, hereinafter referred to as spatial auditory localization.

Particularly, the system comprises:

- a visual output device configured to be worn at the level of the patient's head such that a movement of the patient's head in a direction of movement causes a simultaneous and proportional movement of the visual output device in the direction of movement, the visual output device comprising at least one display unit intended to display a virtual environment in the direction of at least one eye of the patient,
- a sound output device configured to broadcast at least one output audio signal at the level of at least one ear of the patient,
- a movement detection device configured to detect at least one movement of all or part of the body of a patient and generate at least one measurement representative of a movement of the patient,
- at least one processor coupled to the visual output device, to the sound output device and to the movement detection device.

Furthermore, the processor is configured to:

- obtain a virtual auditory space associated with the virtual environment, from a model representative of the acoustic behavior of at least one physical auditory space of the real world or of an artificial world, the virtual auditory space being configured to reproduce, in the virtual environment, the acoustic behavior of the physical auditory space of the real world or of an artificial world,
- insert and arrange, in the virtual auditory space, a plurality of virtual positions of virtual sound sources, around a virtual position of observation of the virtual environment by the patient,
- control the sound output device to broadcast the output audio signal so that, to the patient, the output audio signal seems to come from at least one of the virtual positions of virtual sound sources,
- detect at least a first movement of the patient or induced by the patient, in response to the broadcasting of the output audio signal,
- obtain, from the movement detection device, at least one measurement, in response to the detection of at least a first movement of the patient or induced by the patient and until detection of at least a second predetermined movement of the patient or induced by the patient, and
- calculate at least one spatial auditory localization score of the patient, at least from the virtual auditory space and the measurement.

In a first embodiment, the processor is further configured to:

- obtain a biomathematical model that describes the spatial auditory localization score as a function of at least one auditory localization ability class, and
- use the spatial auditory localization score of the patient as input to the biomathematical model so as to determine the auditory localization ability class to which the patient belongs.

In one example of the first embodiment, the biomathematical model describes the auditory localization score, furthermore, as a function of at least one physiological auditory characteristic specific to the morphology of a listener, the processor being further configured to:

- obtain at least one physiological auditory characteristic of the patient, and
- use the spatial auditory localization score of the patient and the physiological auditory characteristic of the patient as inputs to the biomathematical model so as to determine the auditory localization ability class to which the patient belongs.

In a second embodiment, the processor is further configured to generate the output audio signal from an input audio signal broadcast in the virtual auditory space.

In a third embodiment, the movement detection device comprises at least a first orientation sensor integrated with the visual output device, the first orientation sensor being configured to provide at least one measurement representative of the orientation in space of the visual output device.

In a fourth embodiment, the system further comprises a movable control lever, whose position and orientation are determined by the patient, and which is coupled to the processor. Furthermore, the movement detection device comprises at least a second orientation sensor integrated with the control lever, the second orientation sensor being configured to provide at least one measurement representative of the orientation in space of the control lever.

In one example of the fourth embodiment, the control lever further comprises at least one control button, the control button being configured to generate a signal indicative of the detection of the second predetermined movement.

In a fifth embodiment, the movement detection device comprises at least one image processing unit coupled to the visual output device, the image processing unit being configured to provide at least one measurement representative of a movement of the patient's hand which interacts with the virtual environment.

The invention also relates to a method for determining a score representative of the spatial auditory localization ability of a patient, hereinafter referred to as spatial auditory localization.

Particularly, the method comprises:

a first step of providing a visual output device configured to be worn at the level of the patient's head such that a movement of the patient's head in a direction of movement causes a simultaneous and proportional movement of the visual output device in the direction of movement, the visual output device comprising at least one display unit intended to display a virtual environment in the direction of at least one eye of the patient, a second step of providing a sound output device configured to broadcast at least one output audio signal at the level of at least one ear of the patient, a third step of providing at least one movement of all or part of the body of a patient and generating at least one measurement representative of a predetermined movement of the patient, a fourth step of providing at least one processor coupled to the visual output device, to the sound output device and to the movement detection device, a first step of obtaining, by the processor, a virtual auditory space associated with the virtual environment, from a model representative of the acoustic behavior of at least one physical auditory space of the real world or of an artificial world, so that the virtual auditory space reproduces, in the virtual environment, the acoustic behavior of the physical auditory space of the real world or of an artificial world, a step of inserting and arranging, in the virtual auditory space, by the processor, a plurality of virtual positions of virtual sound sources, around a virtual position of observation of the virtual environment by the patient, a step of controlling, by the processor, the sound output device to broadcast the output audio signal so that, to the patient, the output audio signal seems to come from at least one of the virtual positions of virtual sound sources, a step of detecting, by the processor, at least a first movement of the patient, in response to the broadcasting of the output audio signal, a second step of obtaining, from the movement detection device, by the processor, at least one measurement, in response to the detection of at least a first movement of the patient or induced by the patient and until detection of at least a second predetermined movement of the patient or induced by the patient, and a step of calculating, by the processor, at least one spatial auditory localization score of the patient, at least from the virtual auditory space and the measurement.

In one embodiment, the method further comprises:

a third step of obtaining, by the processor, a biomathematical model, which describes the spatial auditory localization score as a function of at least one auditory localization ability class, and a step of using, by the processor, the spatial auditory localization score of the patient as input to the biomathematical model so as to determine the auditory localization ability class to which the patient belongs.

BRIEF DESCRIPTION OF THE DRAWINGS

Other characteristics and advantages of the invention will be better understood upon reading the following description and with reference to the appended drawings, given by way of illustration and without limitation.

FIG. 1 represents one embodiment of the system according to the invention.

FIG. 2 represents one embodiment of a method according to the invention.

The figures do not necessarily meet the scales, in particular in thickness, and this for illustrative purposes.

In the different figures, the dotted lines and arrows indicate facultative or optional elements, steps and sequences.

DESCRIPTION OF THE EMBODIMENTS

One of the objectives of this invention is to allow carrying out audiometric evaluations in natural or artificial sound spaces, in a way that can be monitored and reproduced.

For that purpose, the inventors propose to create virtual environments that reproduce sound and visual characteristics of natural or artificial spaces. In practice, a user experience is initiated between a subject and a virtual environment so as to simulate a specific audiometry test. Finally, a spatial auditory localization score is determined from measurements taken in the virtual environment.

With such an arrangement, the inventors have confirmed the possibility to carry out audiometric evaluations in a way that can be monitored and reproduced.

Thus, the invention relates to a system for determining a score representative of the spatial auditory localization ability of a patient, hereinafter referred to as spatial auditory localization score.

Conventionally, the system according to the invention can be used to evaluate the spatial auditory localization ability of a patient, namely the localization in the horizontal plane (referred to as azimuthal localization), the localization in the vertical plane (referred to as elevation localization) and/or the distance (i.e. distance between the sound source and the patient) localization.

Furthermore, the system according to the invention can also be used as part of a training for improving the spatial auditory localization ability of a patient.

As illustrated in the example of FIG. 1, the system 100 comprises a visual output device 110, a sound output device 120, a movement detection device 180, and at least one processor 130.

The visual output device 110 is configured to be worn at the level of the patient's head.

In one example, the visual output device 110 comprises a helmet-like casing that covers the patient's head.

Particularly, the visual output device 110 is intended to be worn so that a movement of the patient's head in a direction of movement causes a simultaneous and proportional movement of the visual output device 110 in the direction of movement.

Furthermore, the visual output device 110 comprises at least one display unit 111.

Particularly, the display unit 111 is intended to display a virtual environment in the direction of at least one eye of the patient.

For example, the display unit 111 is a viewing screen.

In a first particular example, the display unit 111 is intended to display the virtual environment in the direction of only one eye of the patient.

In a second particular example, the display unit 111 is intended to display the virtual environment in the direction of each of the patient's eyes.

However, as needed, other arrangements of the display unit 111 can be envisaged, without requiring substantial modifications to the invention.

In one particular implementation, the display unit 111 is configured to allow interaction between the patient and the virtual environment.

In one example, the virtual environment is chosen among: an augmented reality mode, a virtual reality mode and a combination thereof.

In one particular embodiment, the system 100 further comprises a virtual environment generation unit 140 coupled to the visual output device 110.

In practice, the virtual environment generation unit 140 is of the known type and is configured to generate at least one image of a virtual environment.

In one example of the particular embodiment, the system 100 also comprises an image acquisition unit 150 which is coupled to the virtual environment generation unit 140.

In practice, the image acquisition unit 150 is of the known type and is configured to acquire at least one image of a real environment.

Furthermore, the virtual environment generation unit 140 is further configured to generate the image of the virtual environment from the image of the real environment.

Still in FIG. 1, the sound output device 120 is configured to broadcast at least one output audio signal at the level of at least one ear of the patient.

In one example, the sound output device 120 is an audio transducer, as selected among: a headset, an earphone system, and a combination thereof.

In the example of FIG. 1, the movement detection device 180 is configured to detect at least one movement of all or part of the body of a patient and generate at least one measurement representative of a movement of the patient.

In a first particular implementation, the movement detection device 180 comprises at least a first orientation sensor 112 which is integrated with the visual output device 110. Particularly, the first orientation sensor 112 is configured to provide at least one measurement that is representative of the orientation in space of the visual output device 110.

In one example, the first orientation sensor 112 is chosen among: an inertial measurement unit, a gyroscope, a triaxial gyroscope, an accelerometer, a triaxial accelerometer and a combination thereof.

In a second particular implementation, the movement detection device 180 comprises at least one eye movement detection unit which is integrated with the visual output device 110. Particularly, the eye movement detection unit is configured to provide at least one measurement that is representative of the movement of the patient's eyes.

In one example, the eye movement detection unit comprises a set of infrared mirrors and sensors.

In a third particular implementation, the system 100 comprises a control lever 160 which is movable, whose position and orientation are determined by the patient, and which is coupled to the processor 130. Furthermore, the movement detection device 180 comprises at least a second orientation sensor that is integrated with the control lever 160. Particularly, the second orientation sensor is configured to provide at least one measurement that is representative of the orientation in space of the control lever 160.

In one example, the second orientation sensor is chosen among: an inertial measurement unit, a gyroscope, a triaxial gyroscope, an accelerometer, a triaxial accelerometer and a combination thereof.

In a fourth particular implementation, the movement detection device 180 comprises at least one image processing unit 170 which is coupled to the visual output device 110. Particularly, the image processing unit 170 is configured to provide at least one measurement that is representative of a movement of the patient's hand that interacts with the virtual environment.

Returning to FIG. 1, the processor 130 is coupled to the visual output device 110, to the sound output device 120 and to the movement detection device 180.

First of all, the processor 130 is configured to obtain a virtual auditory space which is associated with the virtual environment.

In known manner, a Virtual Auditory Space (VAS) is a virtual sound scene which comprises a set of sound sources that exist only in the perceptual space of a listener.

In other words, a virtual auditory space exists only in the perception of the listener and represents, as such, a mental image that is suggested to the listener. Conventionally, such a suggestion is implemented through acoustic signals which are applied to the listener's eardrums and which are suitably monitored so as to produce the desired auditory illusion.

In practice, it is possible to create a virtual auditory space from a model representative of the acoustic behavior of at least one physical auditory space of the real world or of an artificial world.

Thus, the virtual auditory space can be configured to reproduce, in the virtual environment, the acoustic behavior of the physical auditory space of the real world or of an artificial world.

In a first particular embodiment, the virtual auditory space uses a model of representation of a three-dimensional audio scene of known type.

For example, such a model of representation of a three-dimensional audio scene can be chosen among the following technologies: stereophony, multichannel 5.1, Ambisonic and Higher Order Ambisonic (HOA), Holophony and Wave Field Synthesis (WFS), binaural, Vector Base Amplitude Panning and Vector Base Intensity Panning (VBAP and VBIP) and a combination thereof.

In a second particular embodiment, the virtual auditory space has virtual sound propagation characteristics.

In the invention, the processor 130 uses the sound propagation characteristics of the virtual auditory space to generate the output audio signal.

In practice, the processor 130 broadcasts an input audio signal into the virtual auditory space. Subsequently, the processor 130 encodes the input audio signal which is broadcast so as to form sound data of a predetermined type. For example, the predetermined type can be an R-Order Ambisonic type, with R being a natural integer greater than 1. In such an example, the processor 130 can perform the transformation using a fast Fourier transform, a matrix multiplication, an inverse fast Fourier transform or using a band-pass filter. Finally, the processor 130 decodes the sound data to form the output audio signal.

In a third particular embodiment, the virtual environment comprises at least one sound occlusion structure which is configured to modify, in the virtual auditory space, the propagation of a sound wave.

For example, the sound occlusion structure can modify the propagation of the input audio signal by using physical phenomena chosen among: the reflection, the diffraction, the refraction, the absorption, the generation of at least one interference and a combination thereof.

Returning to FIG. 1, the processor 130 is further configured to insert and arrange, in the virtual auditory space, a plurality of virtual positions of virtual sound sources.

Preferably, the processor 130 arranges the plurality of virtual positions of virtual sound sources around a virtual position of observation of the virtual environment by the patient.

In one particular implementation, all or part of the plurality of virtual positions of virtual sound sources is movable in the virtual environment between a respective starting position and a respective ending position.

Subsequently, the processor 130 is further configured to control the sound output device 120 to broadcast the output audio signal so that, to the patient, the output audio signal seems to come from at least one of the virtual positions of virtual sound sources.

Then, the processor 130 is further configured to detect at least a first movement of the patient or induced by the patient, in response to the broadcasting of the output audio signal.

Next, the processor 130 is further configured to obtain, from the movement detection device 180, at least one measurement, in response to the detection of at least a first movement of the patient or induced by the patient and until detection of at least a second predetermined movement of the patient or induced by the patient.

In one example, the processor 130 periodically obtains, at a predetermined period, at least one measurement. For example, the predetermined period is comprised between 100 ms and 1 second.

In a first particular implementation, when the movement detection device 180 comprises the first orientation sensor 112 which is integrated with the visual output device 110, the first movement and the second predetermined movement can be chosen among: a pivoting of the patient's head relative to a predetermined axis, a translational movement of the patient's head along an axis of translation and a rotational movement of the patient's head about an axis of rotation.

However, as needed, other movements of the head can be envisaged, for example, for a predetermined period, without requiring substantial modifications to the invention.

In a second particular implementation, when the movement detection device 180 comprises the eye movement detection unit which is integrated with the visual output device 110, the first movement and the second predetermined movement can be chosen among: a tilting movement of the patient's eyes relative to a predetermined axis, a translational movement of the patient's eyes along an axis of translation and a rotational movement of the patient's eyes about an axis of rotation.

However, as needed, other eye movements can be envisaged, for example, for a predetermined period, without requiring substantial modifications to the invention.

In a third particular implementation, when the system 100 comprises the control lever 160 which integrates the second orientation sensor, the first movement and the second predetermined movement can be chosen among: a pivoting of the control lever 160 relative to a predetermined axis, a translational movement of the control lever 160 along an axis of translation and a rotational movement of the control lever 160 about an axis of rotation.

However, as needed, other movements of the control lever 160 can be envisaged, for example, for a predetermined period, without requiring substantial modifications to the invention.

In one embodiment of the third particular implementation, the control lever 160 further comprises at least one control button. Particularly, the control button is configured to generate a signal indicative of the detection of the second predetermined movement.

Thus, with this arrangement, when the patient presses the control button, this allows the processor 130 to stop obtaining the measurement from the movement detection device 180.

In a fourth particular implementation, when the movement detection device 180 comprises the image processing unit 170 which is coupled to the visual output device 110, the first movement and the second predetermined movement can be chosen among: a pivoting of the patient's hand relative to a predetermined axis, a translational movement of the patient's hand along an axis of translation and a rotational movement of the patient's hand about an axis of rotation.

However, as needed, other movements of the hand or of another part of the body can be envisaged, for example, for a predetermined period, without requiring substantial modifications to the invention.

Finally, the processor 130 is further configured to calculate at least one spatial auditory localization score of the patient, at least from the virtual auditory space and the measurement.

The invention is not limited to a particular way of calculating a score from the virtual auditory space and the measurement.

Thus, as needed, methods for calculating the spatial auditory localization score other than those presented below can be envisaged, without requiring substantial modifications to the invention.

For example, it will be possible to calculate several spatial auditory localization scores with the same output audio signal, but with virtual sound sources which are disposed virtually at different distances from the patient. In this case, at least one score per virtual distance will be obtained.

In a first example, a first spatial auditory localization score of the patient, hereinafter referred to as Sk1, comprises the calculation of a position deviation between the position of the virtual sound source from which the output audio signal comes, hereinafter referred to as X1, and the position indicated by the patient via the movement detection device 180, hereinafter referred to as X2.

In the invention, Sk1 can be determined from the positions in the horizontal plane (referred to as azimuthal localization) and/or in the vertical plane (referred to as elevation localization).

Thus, in one example, if X1=10° and X2=25°, then Sk1=X1−X2=−15°.

In a second example, a second spatial auditory localization score of the patient, hereinafter referred to as Sk2, comprises the determination of the accuracy of the decision made by the patient.

Particularly, Sk2 allows taking into account the way in which the patient moves all or part of his body in the horizontal plane (referred to as azimuthal localization) and/or in the vertical plane (referred to as elevation localization) in search of the virtual sound source from which the output audio signal comes, hereafter referred to as X3.

In practice, X3 can be a counter which remains zero as long as the patient is turning towards one direction, then which is incremented, for example at each degree in modified aiming azimuth, and this until detection of a movement by the patient via the movement detection device 180. In one example, it is possible to increment X3 by one degree for each degree in modified aiming azimuth.

Thus, one example will give X3=30°, if X1=90° and if the patient has first turned all or part of his body up to 100°, then changed his mind to return to 80°, and finally again move to 90°. In this case, the patient will have moved by 20° (when changing from 100° to 80°), then by 10° (when changing from 80° to 90°), namely 30° in total)(=20°+10°.

In this example, if X3=30° and if the response time to the output audio signal, hereinafter referred to as Tr, is such that Tr=4.5 s, then Sk2=(360−X3)/Tr=(360-30)/4.5=73.33.

Preferably, the different spatial auditory localization scores can be combined to obtain a final spatial auditory localization score.

In a first particular implementation, the processor 130 is further configured to:

- obtain a biomathematical model that describes the spatial auditory localization score as a function of at least one auditory localization ability class, and
- use the spatial auditory localization score of the patient as input to the biomathematical model so as to determine the auditory localization ability class to which the patient belongs.

Thus, with this first particular implementation, the spatial auditory localization score of the patient can be compared with the scores obtained by the normal-hearing and/or hard-of-hearing people.

In a first example, the auditory localization ability class is a class that describes tonal characteristics such as the hearing impairment audiometric class as defined by the recommendation 02/1 bis of the International Bureau for Audiophonology (BIAP). In this recommendation, the different classes can be chosen among: normal hearing, mild deafness, moderate deafness, severe deafness, profound deafness and total deafness.

In a second example, the auditory localization ability class is a class that describes age characteristics.

In a third example, the auditory localization ability class is a class that describes auditory field characteristics that is defined as the area delimited by the hearing threshold and the discomfort threshold in the audible frequency region.

In a fourth example, the auditory localization ability class is a class that describes voice characteristics such as voice intelligibility.

However, as needed, other physiological classes can be envisaged, without requiring substantial modifications to the invention.

In a second particular implementation, the biomathematical model describes the auditory localization score, in addition, as a function of at least one physiological auditory characteristic specific to the morphology of a listener.

For example, the physiological auditory characteristic comprises a Head Related Transfer Function (HRTF) or a Head-Related Impulse Response (HRIR).

Thus, in this second particular implementation, the processor 130 is further configured to:

- obtain at least one physiological hearing characteristic of the patient, and
- use the spatial auditory localization score of the patient and the physiological auditory characteristic of the patient as inputs to the biomathematical model in order to determine the auditory localization ability class to which the patient belongs.

Thus, with this particular implementation, a more accurate prediction can be obtained, because the spatial auditory localization score of the patient can be compared with the scores obtained by the normal-hearing and/or hard-of-hearing people who are physiologically close to the patient.

In a third implementation of the invention, the biomathematical model is an automatic learning model that has been trained on a plurality of n-tuples comprising at least one auditory localization ability class and at least one spatial auditory localization score.

In one example of the third implementation of the invention, each tuple can comprise a physiological auditory characteristic of a listener.

In one particular embodiment, the processor 130 is further configured to discriminate the consideration of the measurement to calculate the spatial auditory localization score, in particular when the system comprises at least two particular implementations of the movement detection device 180 as described above.

In a first example of this particular embodiment, the processor 130 deactivates the consideration of the measurement that comes from at least one particular implementation of the movement detection device 180 and only takes into account the measurement that comes from only one implementation of the movement detection device 180.

In a second example of this particular embodiment, the processor 130 takes into account a combination of the measurements that come from at least two particular implementations of the movement detection device 180.

In one example, the processor 130 calculates this combination as a mathematical magnitude chosen among: an average, a median, a mode, a minimum and a maximum.

However, as needed, other mathematical magnitudes can be envisaged, without requiring substantial modifications to the invention.

The invention also relates to a method for determining a score that is representative of the spatial auditory localization ability of a patient, hereinafter referred to as spatial auditory localization score.

First of all, as presented in relation to FIG. 2, the method 200 comprises a first step of providing 201 a visual output device 110 as described above.

Next, the method 200 comprises a second step of providing 202 a sound output device 120 as described above.

Next, the method 200 comprises a third step of providing 203 at least one measurement representative of a predetermined movement of the patient.

Then, the method 200 comprises a fourth step of providing 204 at least one processor 130 as described above, so that the processor 130 is coupled to the visual output device 110, to the sound output device 120 and to the movement detection device 180.

Subsequently, the method 200 comprises a first step of obtaining 205, by the processor 130, a virtual auditory space associated with the virtual environment, from a model representative of the acoustic behavior of at least one physical auditory space of the real world or of an artificial world, so that the virtual auditory space reproduces, in the virtual environment, the acoustic behavior of the physical auditory space of the real world or of an artificial world.

Next, the method 200 comprises a step of inserting and arranging 206, in the virtual auditory space, by the processor 130, a plurality of virtual positions of virtual sound sources, around a virtual position of observation of the virtual environment by the patient.

Then, the method 200 comprises a step of commanding 207, by the processor 130, the sound output device 120 to broadcast the output audio signal so that, to the patient, the output audio signal seems to come from at least one of the virtual positions of virtual sound sources.

Subsequently, the method 200 comprises a step of detecting 208, by the processor 130, at least a first movement of the patient or induced by the patient, in response to the broadcasting of the output audio signal.

Then, the method 200 comprises a second step of obtaining 209, from the movement detection device 180, by the processor 130, at least one measurement, in response to the detection of at least a first movement of the patient or induced by the patient and until detection of at least a second predetermined movement of the patient or induced by the patient.

Finally, the method 200 comprises a step of calculating 210, by the processor 130, at least one spatial auditory localization score of the patient, at least from the virtual auditory space and the measurement.

In one particular implementation, the method 200 further comprises:

- a third step of obtaining 211, by the processor 130, a biomathematical model, which describes the spatial auditory localization score as a function of at least one auditory localization ability class, and
- a step of using 212, by the processor 130, the spatial auditory localization score of the patient as input to the biomathematical model so as to determine the auditory localization ability class to which the patient belongs.

The invention have been described and illustrated. However, the invention is not limited to the embodiments presented above. Thus, an expert in the field can deduce other variants and embodiments, upon reading the description and the appended figures.

The invention may be the object of numerous variants and applications other than those described above. Particularly, unless otherwise indicated, the different structural and functional characteristics of each of the implementations described above should not be considered as combined and/or closely and/or inextricably related to each other but, on the contrary, as simple juxtapositions. In addition, the structural and/or functional characteristics of the different embodiments described above may be the object in whole or in part of any different juxtaposition or any different combination.

The invention claimed is:

1. A system for performing an audiometric evaluation of a patient by determining a score representative of a spatial auditory localization of the patient, the system comprising:

- a visual output device configured to be worn at a level of the patient's head such that a movement of the patient's head in a direction of movement causes a simultaneous and proportional movement of the visual output device in the direction of movement, the visual output device comprising a display unit configured to display a virtual environment in a direction of an eye of the patient,
- a sound output device configured to broadcast an output audio signal at a level of an ear of the patient,
- a movement detection device configured to detect a movement of all or part of a body of the patient and to generate a measurement representative of the movement of the patient,
- a processor coupled to the visual output device, to the sound output device and to the movement detection device, the processor being configured to:
  - obtain a virtual auditory space associated with the virtual environment, from a model representative of an acoustic behavior of a physical auditory space of the real world or of an artificial world, the virtual auditory space being configured to reproduce, in the virtual environment via virtual sound sources, the acoustic behavior of the physical auditory space of the real world or of the artificial world, wherein the reproduced acoustic behavior is not based on a recording of a real sound source in a real environment,
  - insert and arrange, in the virtual auditory space, a plurality of virtual positions of the virtual sound sources, around a virtual position of observation of the virtual environment by the patient,
  - control the sound output device to broadcast the output audio signal so that, to the patient, the output audio signal seems to come from at least one of the plurality of virtual positions of the virtual sound sources,
  - detect a first movement of the patient or induced by the patient, in response to the broadcasting of the output audio signal,
  - obtain, periodically, from the movement detection device, a measurement, in response to the detection of the first movement of the patient or induced by the patient and until detection of a second predetermined movement of the patient or induced by the patient,
  - calculate at least a first spatial auditory localization score (Sk1) representative of an accuracy of localization of the virtual sound source, wherein the first spatial auditory localization score (Sk1) comprises a measure of difference between a perceived location and an actual location of the virtual sound source,
  - calculate at least a second spatial auditory localization score (Sk2) representative of an efficiency of decision-making during localizations, wherein the second spatial auditory localization score (Sk2):
    - a) is representative of a quality of an exploration strategy implemented by the patient to locate the virtual sound source, and
    - b) includes a combination of:
    - (i) a temporal parameter representing a response time of the patient's decision, and
    - (ii) a spatial parameter (X3) representing an angular movement of the patient's body in at least one of azimuthal or elevation planes during search for the virtual sound source,
    - wherein the spatial parameter (X3) is calculated by the processor from the measurement of body movement detected by the movement detection device, and
  - input the second spatial auditory localization score (Sk2) of the patient into a biomathematical model that describes the second spatial auditory localization score (Sk2) as a mathematical function of auditory localization ability class to determine the auditory localization ability class to which the patient belongs.

2. The system according to claim 1, wherein the second spatial auditory localization score (Sk2) of the patient is a counter, and the processor is configured to:

- maintain a value of the counter to a predetermined value while the patient is turning towards a predetermined direction, and
- vary the value of the counter as a function of a change of direction different from the predetermined direction.

3. The system according to claim 1, wherein the biomathematical model further describes the second spatial auditory localization score as a mathematical function of a physiological auditory characteristic specific to a morphology of a listener,

- the processor being further configured to:
  - input the second spatial auditory localization score of the patient and the physiological auditory characteristic of the patient into the biomathematical model to determine the auditory localization ability class to which the patient belongs.

4. The system according to claim 1, further comprising a movable control lever, whose position and orientation are determined by the patient, and which is coupled to the processor, wherein the movement detection device comprises a second orientation sensor integrated with the control lever, the second orientation sensor being configured to provide a measurement representative of an orientation in space of the control lever.

5. The system according to claim 4, wherein the processor is further configured to:

cease obtaining the measurement based on detection, by the movement detection device, of the second predetermined movement of the patient.

6. The system according to claim 1, wherein the movement detection device comprises a first orientation sensor integrated with the visual output device, the first orientation sensor being configured to provide a measurement representative of an orientation in space of the visual output device.

7. The system according to claim 1, wherein the movement detection device comprises an image processing unit coupled to the visual output device, the image processing unit being configured to provide a measurement representative of a movement of the patient's hand which interacts with the virtual environment.

8. A method for performing an audiometric evaluation of a patient by determining a score representative of a spatial auditory localization of the patient, the method comprising:

providing a visual output device configured to be worn at a level of the patient's head such that a movement of the patient's head in a direction of movement causes a simultaneous and proportional movement of the visual output device in the direction of movement, the visual output device comprising a display unit configured to display a virtual environment in a direction of an eye of the patient, providing a sound output device configured to broadcast an output audio signal at a level of an ear of the patient, providing a movement detection device configured to detect a movement of all or part of a body of the patient and to generate a measurement representative of a predetermined movement of the patient, providing a processor coupled to the visual output device, to the sound output device and to the movement detection device, obtaining, by the processor, a virtual auditory space associated with the virtual environment, from a model representative of an acoustic behavior of a physical auditory space of the real world or of an artificial world, so that the virtual auditory space reproduces, in the virtual environment via virtual sound sources, the acoustic behavior of the physical auditory space of the real world or of an artificial world, wherein the reproduced acoustic behavior is not based on a recording of a real sound source in a real environment, inserting and arranging, in the virtual auditory space, by the processor, a plurality of virtual positions of the virtual sound sources, around a virtual position of observation of the virtual environment by the patient, controlling, by the processor, the sound output device to broadcast the output audio signal so that, to the patient, the output audio signal seems to come from at least one of the plurality of virtual positions of the virtual sound sources, detecting, by the processor, a first movement of the patient, in response to the broadcasting of the output audio signal, obtaining, periodically, from the movement detection device, by the processor, a measurement, in response to the detection of the first movement of the patient or induced by the patient and until detection of a second predetermined movement of the patient or induced by the patient, calculating at least a first spatial auditory localization score (Sk1) representative of an accuracy of localization of the virtual sound source, wherein the first spatial auditory localization score (Sk1) comprises a measure of difference between a perceived location and an actual location of the virtual sound source, calculating at least a second spatial auditory localization score (Sk2) representative of an efficiency of decision-making during localizations, wherein the second spatial auditory localization score (Sk2):

a) is representative of a quality of an exploration strategy implemented by the patient to locate the virtual sound source, and b) includes a combination of:

(i) a temporal parameter representing a response time of the patient's decision, and (ii) a spatial parameter (X3) representing an angular movement of the patient's body in at least one of azimuthal or elevation planes during search for the virtual sound source, wherein the spatial parameter (X3) is calculated by the processor from the measurement of body movement detected by the movement detection device, and inputting, by the processor, the second spatial auditory localization score (Sk2) of the patient into a biomathematical model that describes the second spatial auditory localization score (Sk2) as a mathematical function of auditory localization ability class to determine the auditory localization ability class to which the patient belongs.

9. The method according to claim 8, wherein the biomathematical model further describes the second spatial auditory localization score (Sk2) as a mathematical function of a physiological auditory characteristic specific to a morphology of a listener, the method further comprising:

inputting, by the processor, the second spatial auditory localization score (Sk2) of the patient and the physiological auditory characteristic of the patient into the biomathematical model to determine the auditory localization ability class to which the patient belongs.

10. The method according to claim 8, wherein second the spatial auditory localization score (Sk2) of the patient is a counter, and the calculating the second spatial auditory localization score (Sk2) of the patient comprises:

maintaining, by the processor, a value of the counter to a predetermined value while the patient is turning towards a predetermined direction, and varying, by the processor, the value of the counter as a function of a change of direction different from the predetermined direction.

11. The method according to claim 8, wherein the movement detection device comprises an image processing unit coupled to the visual output device, the method further comprising:

providing, by the image processing unit, a measurement representative of a movement of the patient's hand which interacts with the virtual environment.

12. The method according to claim 8, wherein the movement detection device comprises a first orientation sensor integrated with the visual output device, the method further comprising:

providing, by the first orientation sensor, a measurement representative of an orientation in space of the visual output device.

13. The method according to claim 8, wherein the processor is coupled to a movable control lever whose position and orientation are determined by the patient, and the movement detection device comprises a second orientation sensor integrated with the control lever, the method further comprising:

providing, by the second orientation sensor, a measurement representative of an orientation in space of the control lever.

14. The method according to claim 13, further comprising:

ceasing the obtaining of the measurement based on detecting, by the movement detection device, the second predetermined movement of the patient.

15. A system for determining a score representative of a spatial auditory localization of a patient, the system comprising:

a visual output device configured to be worn at a level of the patient's head such that a movement of the patient's head in a direction of movement causes a simultaneous and proportional movement of the visual output device in the direction of movement, the visual output device comprising a display unit configured to display a virtual environment in a direction of an eye of the patient, a sound output device configured to broadcast an output audio signal at a level of an ear of the patient, a movement detection device configured to detect a movement of all or part of a body of the patient and to generate a measurement representative of the movement of the patient, a processor coupled to the visual output device, to the sound output device and to the movement detection device, the processor being configured to:

obtain a virtual auditory space associated with the virtual environment, from a model representative of an acoustic behavior of a physical auditory space of the real world or of an artificial world, the virtual auditory space being configured to reproduce, in the virtual environment via virtual sound sources, the acoustic behavior of the physical auditory space of the real world or of the artificial world, wherein the reproduced acoustic behavior is not based on a recording of a real sound source in a real environment, insert and arrange, in the virtual auditory space, a plurality of virtual positions of the virtual sound sources, around a virtual position of observation of the virtual environment by the patient, control the sound output device to broadcast the output audio signal so that, to the patient, the output audio signal seems to come from at least one of the plurality of virtual positions of the virtual sound sources, detect a first movement of the patient or induced by the patient, in response to the broadcasting of the output audio signal, obtain, periodically, from the movement detection device, a measurement, in response to the detection of the first movement of the patient or induced by the patient and until detection of a second predetermined movement of the patient or induced by the patient, and calculate a spatial auditory localization score of the patient, at least from the virtual auditory space and the measurement, wherein the spatial auditory localization score is representative of an efficiency of a decision-making in localization, wherein the efficiency:

a) is distinct form an accuracy of localization, b) characterizes a quality of an exploration strategy implemented by the patient to locate the virtual sound source, and c) includes a combination of:

(i) a temporal component representing a response time of the patient's decision, and (ii) a spatial component representing a calculated parameter (X3) that determines angular movement of the patient's body at least one of azimuthal or elevation planes during search for the virtual sound source, wherein the parameter (X3) is calculated by the processor from the measurement of body movement detected by the movement detection device.

16. The system according to claim 15, wherein the spatial auditory localization score of the patient is a counter, and the processor is configured to:

maintain a value of the counter to a predetermined value while the patient is turning towards a predetermined direction, and vary the value of the counter as a function of a change of direction different from the predetermined direction.

17. The system according to claim 15, wherein the processor is further configured to:

input the spatial auditory localization score of the patient into a biomathematical model that describes the spatial auditory localization score as a mathematical function of auditory localization ability class to determine the auditory localization ability class to which the patient belongs.

18. The system according to claim 17, wherein the biomathematical model further describes the spatial auditory localization score as a mathematical function of a physiological auditory characteristic specific to a morphology of a listener, the at least one processor being further configured to:

input the spatial auditory localization score of the patient and the physiological auditory characteristic of the patient into the biomathematical model to determine the auditory localization ability class to which the patient belongs.

* * * * *